(12) United States Patent
Ji

(10) Patent No.: US 12,108,405 B2
(45) Date of Patent: Oct. 1, 2024

(54) RESOURCE INDICATION METHOD, DEVICE AND SYSTEM

(71) Applicant: VIVO MOBILE COMMUNICATION CO., LTD., Guangdong (CN)

(72) Inventor: Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 586 days.

(21) Appl. No.: 17/243,928

(22) Filed: Apr. 29, 2021

(65) Prior Publication Data

US 2021/0250924 A1 Aug. 12, 2021

Related U.S. Application Data

(63) Continuation of application No. PCT/CN2019/106796, filed on Sep. 19, 2019.

(30) Foreign Application Priority Data

Nov. 2, 2018 (CN) .......................... 201811303088.9

(51) Int. Cl.
*H04W 72/23* (2023.01)
*H04L 5/00* (2006.01)
*H04W 76/14* (2018.01)

(52) U.S. Cl.
CPC .......... *H04W 72/23* (2023.01); *H04W 76/14* (2018.02); *H04L 5/0055* (2013.01); *H04L 5/0094* (2013.01)

(58) Field of Classification Search
CPC ..... H04W 72/23; H04W 76/14; H04W 72/02; H04W 72/20; H04W 72/044; H04W 92/18; H04L 5/0055; H04L 5/0094; H04L 5/0023

See application file for complete search history.

(56) References Cited

U.S. PATENT DOCUMENTS

| | | | |
|---|---|---|---|
| 11,570,757 B2* | 1/2023 | Panteleev | .......... H04W 40/246 |
| 2016/0338094 A1 | 11/2016 | Faurie et al. | |
| 2017/0347394 A1* | 11/2017 | Yasukawa | ............... H04L 1/189 |
| 2020/0008234 A1* | 1/2020 | Li | ........................ H04W 72/044 |
| 2020/0015198 A1 | 1/2020 | Zhao et al. | |

(Continued)

FOREIGN PATENT DOCUMENTS

| | | |
|---|---|---|
| CN | 101883401 A | 11/2010 |
| CN | 104125610 A | 10/2014 |

(Continued)

OTHER PUBLICATIONS

First Office Action regarding Korean Patent Application No. 10-2021-7016219, dated Jun. 28, 2022. Translation provided by Bohui Intellectual Property.

(Continued)

*Primary Examiner* — Habte Mered
(74) *Attorney, Agent, or Firm* — Harness, Dickey & Pierce, P.L.C.

(57) ABSTRACT

A resource indication method applied to a sidelink transmission process. The method includes: determining, by a first device, a first resource, where the first resource is used for transmitting first feedback information; and sending, by the first device, first indication information to a second device, where the first indication information is used to indicate the first resource.

16 Claims, 6 Drawing Sheets

(56) References Cited

U.S. PATENT DOCUMENTS

| | | | |
|---|---|---|---|
| 2020/0022089 A1* | 1/2020 | Guo | H04L 1/1812 |
| 2020/0029318 A1* | 1/2020 | Guo | H04L 1/1822 |
| 2020/0092692 A1* | 3/2020 | Wang | H04W 76/14 |
| 2021/0235396 A1* | 7/2021 | Jung | H04W 52/48 |
| 2021/0266133 A1* | 8/2021 | Zhang | H04L 1/1861 |
| 2021/0273767 A1* | 9/2021 | Deng | H04L 5/0005 |
| 2021/0306106 A1* | 9/2021 | Park | H04W 4/40 |
| 2021/0306111 A1* | 9/2021 | Jung | H04L 1/1671 |
| 2021/0306824 A1* | 9/2021 | Li | H04W 4/40 |
| 2021/0385694 A1* | 12/2021 | Freda | H04W 28/0268 |
| 2022/0007403 A1* | 1/2022 | Li | H04W 72/20 |
| 2022/0053496 A1* | 2/2022 | Yu | H04L 1/1896 |
| 2022/0353846 A1* | 11/2022 | Wang | H04W 72/0446 |

FOREIGN PATENT DOCUMENTS

| | | |
|---|---|---|
| CN | 106793092 A | 5/2017 |
| CN | 108631968 A | 10/2018 |
| CN | 108633041 A | 10/2018 |
| WO | WO-2016078905 A1 | 5/2016 |
| WO | WO-2018171540 A1 | 9/2018 |
| WO | WO-2018171605 A1 | 9/2018 |
| WO | WO-2018195826 A1 | 11/2018 |

OTHER PUBLICATIONS

"Discussion of sidelink unicast, groupcast and broadcast for NR-V2X," OPPO, 3GPP TSG RAN WG1 Meeting #94bis, R1-1810984, dated Oct. 12, 2018.

"Sidelink PHY structure and procedure for NR V2X," Huawei, HiSilicon, 3GPP TSG RAN WG1 Meeting #94 bis, R1-1810138, dated Oct. 12, 2018.

International Search Report and Written Opinion of the International Searching Authority regarding International Patent Application No. PCT/CN2019/106796, dated Nov. 27, 2019. Translation provided by Bohui Intellectual Property.

First Office Action regarding Chinese Patent Application No. 201811303088.9, dated Oct. 28, 2021. Translation provided by Bohui Intellectual Property.

Supplementary European Search Report regarding Application No. 19880335.5-1215 / 3876636; PCT/CN2019/106796, dated Nov. 30, 2021.

First Office Action regarding European Patent Application No. 19880335.5-1203, dated May 19, 2023.

Second Office Action regarding Korean Patent Application No. 10-2021-7016219, dated Mar. 25, 2023. Translation provided.

"Consideration on resource pool sharing between UEs using mode 3 and mode 4," ZTE, 3GPP TSG-RAN2 Meeting 101, R2-1801961, dated Mar. 2, 2018.

* cited by examiner

RESOURCE INDICATION METHOD, DEVICE AND SYSTEM

CROSS-REFERENCE OF RELATED APPLICATION

This application is a Bypass Continuation Application of PCT/CN2019/106796, filed on Sep. 19, 2019, which claims priority to Chinese Patent Application No. 201811303088.9, filed on Nov. 2, 2018, which are incorporated herein by reference in their entirety.

TECHNICAL FIELD

Embodiments of this disclosure relate to the field of communications technologies, and in particular, to a resource indication method, a device and a system.

BACKGROUND

In a long term evolution (LTE) system, user equipment (UE) may directly perform data transmission without a network device by using a sidelink technology.

SUMMARY

The embodiments of this disclosure provide a resource indication method, a device and a system.

According to a first aspect of the embodiments of this disclosure, the embodiments of this disclosure provide a resource indication method. The method is applied to a sidelink transmission process. The method includes: determining, by a first device, a first resource, where the first resource is used for transmitting first feedback information; and sending, by the first device, first indication information to a second device, where the first indication information is used to indicate the first resource.

According to a second aspect of the embodiments of this disclosure, the embodiments of this disclosure provide a resource indication method. The method is applied to a sidelink transmission process. The method includes: receiving, by receive side UE, first indication information, where the first indication information is used to indicate a first resource, and the first resource is used for transmitting first feedback information; and sending, by the receive side UE, the first feedback information to a target device on the first resource, and the target device includes at least one of transmit side UE or a control node.

According to a third aspect of the embodiments of this disclosure, the embodiments of this disclosure provide a device. The device is applied to a sidelink transmission process. The device may include: a determining unit and a sending unit. The determining unit is configured to determine a first resource, where the first resource is used for transmitting first feedback information; and the sending unit is configured to send first indication information to a second device, where the first indication information is used to indicate the first resource.

According to a fourth aspect of the embodiments of this disclosure, the embodiments of this disclosure provide a device. The device can be receive side UE, and the device is applied to a sidelink transmission process. The device may include: a receiving unit and a sending unit. The receiving unit is configured to receive first indication information, where the first indication information is used to indicate a first resource, and the first resource is used for transmitting first feedback information; and the sending unit is configured to send the first feedback information to a target device on the first resource, and the target device includes at least one of transmit side UE or a control node.

A fifth aspect of the embodiments of this disclosure provides a device, where the device includes: a processor, a memory, and a computer program stored in the memory and executable on the processor, where the computer program, when executed by the processor, implements the steps of the resource indication method according to the foregoing first aspect.

A sixth aspect of the embodiments of this disclosure provides a device, where the network side device includes: a processor, a memory, and a computer program stored in the memory and executable on the processor, where the computer program, when executed by the processor, implements the steps of the resource indication method according to the foregoing second aspect.

A seventh aspect of the embodiments of this disclosure provides a communications system, where the communications system includes the device in the third aspect and the device in the fourth aspect; or the communications system includes the device in the fifth aspect and the device in the sixth aspect.

An eighth aspect of the embodiments of this disclosure provides a non-transitory computer-readable storage medium, where the non-transitory computer-readable storage medium stores a computer program, and the computer program, when executed by a processor, implements the steps of the resource indication method according to the foregoing first aspect or the steps of the resource indication method according to the second aspect.

DETAILED DESCRIPTION OF EMBODIMENTS

Figure 1:
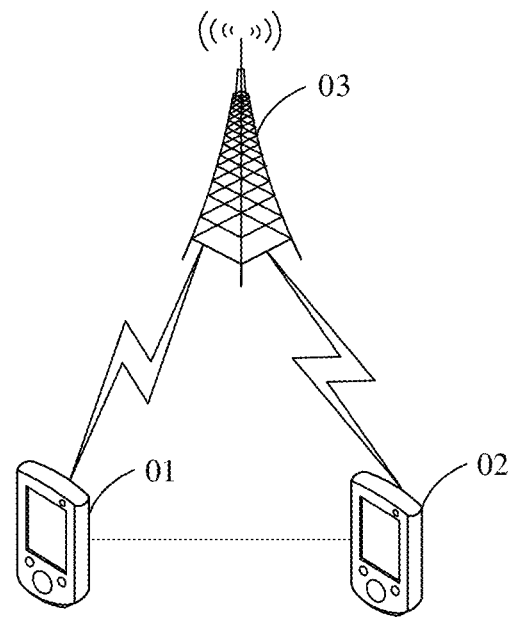
FIG. 1 is a schematic architectural diagram of a communications system according to an embodiment of this disclosure.

The following clearly and completely describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of this disclosure, the terms such as "first" and "second" are used to distinguish different objects, but are not used to describe a particular sequence of the objects. For example, a first device, a second device, and the like are used to distinguish between different devices, but are not used to describe a particular sequence of the devices.

In the embodiments of this disclosure, the term such as "exemplary" or "for example" is used to indicate an example, an instance, or a description. Any embodiment or design scheme described as "exemplary" or "an example" in the embodiments of this disclosure should not be construed as being preferable or advantageous than other embodiments or design schemes. Specifically, the words such as "exemplary" or "for example" are used to present related concepts in a specific manner.

In the description of the embodiments of this disclosure, unless otherwise specified, the meaning of "a plurality of" means two or more. For example, a plurality of elements mean two or more elements.

The following describes some terms/nouns used in the embodiments of this disclosure.

A sidelink is a link between UEs for data transmission, that is, UEs can directly transmit data without a control node, for example, UEs can directly transmit data on a physical layer. For example, the UE may send sidelink control information (SCI) through a physical sidelink control channel (PSCCH), and may transmit service data through a physical sidelink shared channel (PSSCH). A communication interface between UEs can be called a PC5 interface, and a communication interface between UE and a control node can be called a Uu Interface.

Sidelink communication refers to the process in which UE transmits information with other UE on a sidelink. Sidelink communication can include communication such as device to device (D2D) communication and vehicle to everything (V2X) communication. V2X may include vehicle to vehicle (V2V) communication, vehicle to infrastructure (V2I) communication, vehicle to network (V2N) communication, vehicle to pedestrian (V2P) communication, and the like.

The embodiments of this disclosure provide a resource indication method, a device and a system. In a sidelink transmission process, a first device may determine a first resource (the first resource is used for transmitting first feedback information); and send first indication information to a second device (the first indication information is used to indicate the first resource). In this solution, the first device can determine a transmission resource (the first resource) for carrying feedback information. Therefore, in a possible case, if the first device is transmit side UE, the transmit side UE further can allocate a resource (the second resource) for transmitting control information and/or service data. This can avoid that the resource for transmitting the control information and/or the service data conflicts with the resource for transmitting feedback information. In another possible case, if the first device is a control node, the control node further can allocate the resource (the second resource) for transmitting the control information and/or the service data for the transmit side UE. This can avoid that the resource for transmitting the control information and/or the service data conflicts with the resource for transmitting feedback information. In this way, the resource indication method provided in the embodiments of this disclosure can avoid that the resource for transmitting the control information and/or the service data conflicts with the resource for transmitting feedback information.

The resource indication method and the device provided by the embodiments of this disclosure can be applied in various communications systems, such as an NR system, a dedicated short range communications (DSRC) system, a fast basic service setup (802.11p) system, or a future evolved system. The resource indication method and the device can be specifically applied in the scenario in which the control node or the transmit side UE indicates, for the receive side UE, a resource for transmitting feedback information.

For example, FIG. 1 is a schematic architectural diagram of a communications system according to an embodiment of this disclosure. As shown in FIG. 1, the communications system may include: UE 01 (that is, the transmit side UE), UE 02 (that is, the receive side UE), and a control node 03. The UE 01 and the control node 03 can establish connection and communication, the UE 02 and the control node 03 can establish connection and communication, and the UE 01 and the UE 02 can also establish connection and communication. The communication between the UE 01 and the UE 02 can be called sidelink communication.

It should be noted that in the embodiments of this disclosure, as shown in FIG. 1, the UE 01 and the UE 02 may be wirelessly connected. To indicate a connection relationship between the UE 01 and the UE 02 more clearly, in FIG. 1, a solid line is used to indicate the connection relationship between the UE 01 and the UE 02. It does not limit the embodiments of the present disclosure.

The UE is a device providing voice and/or data connectivity to a user, a handheld device having a wired/wireless connection function, or another processing device connected to a wireless modem. The UE may communicate with one or more core network devices through a radio access network (RAN). The UE may be a mobile terminal such as a mobile phone (or referred to as a "cellular" phone) or a computer having a mobile terminal, or may be a portable, pocket-sized, handheld, computer built-in, or vehicle-mounted mobile apparatus, which exchanges language and/or data with the RAN. For example, the mobile apparatus is a device such as a personal communication service (PCS) phone, a cordless phone, a session initiation protocol (SIP) phone, a wireless local loop (WLL) station, or a personal digital assistant (PDA). The UE may be alternatively referred to as a user agent, a terminal device, or the like.

In addition, as shown in FIG. 1 above, an example in which the control node is a base station is used for illustration, which does not form any restriction on this disclosure. In the embodiments of this disclosure, the control node can be a base station or can be UE, which may be specifically determined according to an actual usage requirement. The base station is an apparatus deployed in the RAN to provide a wireless communication function for the UE. A base station may include various forms of macro base stations, micro base stations, relay stations, access points, and the like. In systems using different radio access technologies, names of devices having base station functions may be different. For example, in a fifth generation (5G) system, the device may be referred to as gNB; in a fourth-generation (4G) wireless communication system, the device may be referred to as an evolved NodeB (eNB); and in a third-generation (3G) mobile communications system, the device may be referred to as an NodeB. With evolution of the communications technology, the name of the "base station" may change.

At present, when transmit side UE is in an autonomic resource selection mode (that is, the transmit side UE allocates a transmission resource autonomously), the transmit side UE can reserve a PSSCH resource for itself, and the transmit side UE can send data directly to receive side UE without a network device by using the PSSCH resource.

However, in a new radio (NR) system, after the receive side UE receives the data sent by the transmit side UE, the receive side UE may send feedback information to the transmit side UE to indicate whether the data is received successfully. Therefore, if the receive side UE also reserves a transmission resource for itself to carry the feedback information in the above way, because the receive side UE and the transmit side UE reserve transmission resources for themselves independently, the transmission resource reserved by the receive side UE may conflict with the transmission resource reserved by the transmit side UE, for example, time domain resources of two transmission resources conflict with each other.

Figure 2:
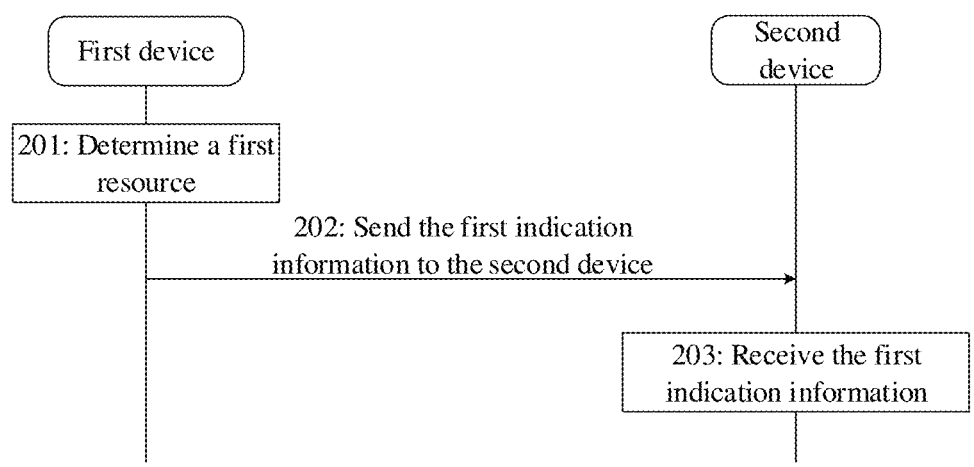
FIG. 2 is a first schematic diagram of a resource indication method according to an embodiment of this disclosure.

Based on the communication system as shown in FIG. 1, as shown in FIG. 2, FIG. 2 shows a resource indication method according to an embodiment of this disclosure. The method may be applied to a sidelink transmission process. The method may include the following steps: step 201 to step 203.

In step 201, a first device determines a first resource.

The first resource may be used for transmitting first feedback information.

Optionally, in the embodiments of this disclosure, the first device can be the control node or the transmit side UE. The control node can be UE or a network side device (e.g. a base station).

Optionally, in the embodiments of this disclosure, the first resource may include at least one of the following: a target resource of a sidelink channel or a target resource of an uplink channel. The sidelink channel can be a PSCCH, a PSSCH, or a physical sidelink feedback channel (PSFCH), the uplink channel can be a physical uplink control channel (PUCCH) or a physical uplink shared channel (PUSCH), and the target resource can include at least one of a time domain resource, a frequency domain resource, a spatial domain resource, and a code domain resource.

Optionally, in the embodiments of this disclosure, the first feedback information can be carried in a first control unit. The first control unit can include at least one of the following: sidelink feedback control information (SFCI) in the sidelink channel, or uplink control information (UCI) in the uplink channel.

For example, the first feedback information can be carried in the SFCI of a PSCCH, or can be carried in the SFCI of a PSSCH, or can be carried in the SFCI of a PSFCH, or can be carried in the UCI of a PUCCH, or can be carried in the UCI of a PUSCH. This may be specifically determined according to a usage requirement, and is not limited in the embodiments of this disclosure.

Optionally, in the embodiments of this disclosure, the first feedback information can include at least one of the following: hybrid automatic repeat request (HARQ), channel measurement information, interference measurement information, power control information, or power control command information. Certainly, the first feedback information further can include other possible information. This may be specifically determined according to a usage requirement, and is not limited in the embodiments of this disclosure.

Optionally, in the embodiments of this disclosure, when the first device is the transmit side UE, the determining, by the first device, the first resource includes any of the following: the transmit side UE allocates the first resource autonomously, and the transmit side UE determines that a resource indicated by fifth indication information obtained from the control node is the first resource. This may be specifically determined according to a usage requirement, and is not limited in the embodiments of this disclosure.

In step 202, the first device sends the first indication information to the second device.

The first indication information can be used to indicate the first resource.

Optionally, in the embodiments of this disclosure, the first device and the second device can include the following optional implementations:

In a first optional implementation, the first device is transmit side UE, and the second device is receive side UE.

In a second optional implementation, the first device is the control node, and the second device is the transmit side UE.

In a third optional implementation, the first device is the control node, and the second device is the receive side UE.

In a fourth optional implementation, the first device is the control node, and the second device is the transmit side UE and the receive side UE.

It should be noted that the sidelink technology in the embodiments of this disclosure supports the scheduled resource allocation mode and the autonomous resource selection mode. Specifically, when the transmit side UE and the receive side UE perform sidelink transmission through the scheduled resource allocation mode, the first device can be the control node, and the second device can include at least one of the transmit side UE or the receive side UE. In this way, the control node can allocate the first resource. When the transmit side UE and the receive side UE perform sidelink transmission through the autonomous resource selection mode, the first device can be the transmit side UE, and the second device can be the receive side UE. In this way, the transmit side UE can allocate the first resource.

Optionally, the resource indication method provided in the embodiments of this disclosure further can include step: sending, by the first device, the second indication information to the second device. The second indication information can be used to indicate a second resource, the second resource can be used for transmitting at least one of first control information or first service data, and the second resource is different from the first resource.

It should be noted that in the embodiments of this disclosure, the first indication information and the second indication information can be the same indication information, or can be different indication information. This may be specifically determined according to a usage requirement, and is not limited in the embodiments of this disclosure.

Optionally, when the first indication information and the second indication information are different indication information, the first device can send the first indication information and the second indication information to the second device at the same time, or send the first indication information to the second device first and then send the second indication information to the second device; or can send the second indication information to the second device first and then send the first indication information to the second device. This may be specifically determined according to a usage requirement, and is not limited in the embodiments of this disclosure.

For example, the first indication information can be used to indicate a PSCCH resource, the second indication information can be used to indicate a PSFCH resource, and the first indication information and the second indication information can be carried in PDCCH DCI at the same time.

It can be understood that compared with that the first indication information and the second indication information are carried in different DCI (or SCI) for transmission, when the first indication information and the second indication information are carried in the same DCI (or SCI), the control overheads and feedback delays of the communication system can be reduced.

Optionally, in the embodiments of this disclosure, the above step 202 can be specifically implemented through the following steps: the first device sends the first control channel to the second device. The first control channel may include the first indication information. The first control channel can include any one of the following: a PSCCH and a physical downlink control channel (PDCCH).

For example, the PSCCH can include the first indication information, or the PDCCH can include the first indication information. It can be understood that during actual implementation, the first control channel further can include another possible channel (the another possible channel may include the first indication information). This may be specifically determined according to a usage requirement, and is not limited in the embodiments of this disclosure.

Optionally, in the embodiment of the present disclosure, the SCI of the PSCCH may include the first indication information, or downlink control information (DCI) of the PDCCH may include the first indication information. It can be understood that the other information of the PSCCH may include the first indication information, or the other information of the PDCCH may include the first indication information. This may be specifically determined according to a usage requirement, and is not limited in the embodiments of this disclosure.

In step 203, the second device receives the first indication information.

The embodiments of this disclosure provide a resource indication method. The first device can determine a transmission resource (the first resource) for carrying feedback information. Therefore, in a possible case, if the first device is transmit side UE, the transmit side UE further can allocate a resource (the second resource) for transmitting control information and/or service data. This can avoid that the resource for transmitting the control information and/or the service data conflicts with the resource for transmitting feedback information. In another possible case, if the first device is a control node, the control node further can allocate the resource (the second resource) for transmitting the control information and/or the service data for the transmit side UE. This can avoid that the resource for transmitting the control information and/or the service data conflicts with the resource for transmitting feedback information. In this way, the resource indication method provided in the embodiments of this disclosure can avoid that the resource for transmitting the control information and/or the service data conflicts with the resource for transmitting feedback information.

Optionally, in the embodiments of this disclosure, if the first device is the transmit side UE and the second device is the receive side UE, the receive side UE can receive the first indication information sent by the transmit side UE; if the first device is the control node and the second device is the transmit side UE, the transmit side UE can receive the first indication information sent by the control node and forward the indication information to the receive side UE, so that the receive side UE can receive the indication information; if the first device is the control node and the second device is the receive side UE, the receive side UE can receive the first indication information sent by the first device. Therefore, the resource indication method provided by the embodiments of the present disclosure may include the following steps 204 and 205.

In step 204, the receive side UE receives the first indication information.

The first indication information can be used to indicate the first resource. The first resource is used for transmitting first feedback information.

In step 205, the receive side UE sends the first feedback information to the target device on the first resource.

The target device can include at least one of the transmit side UE or the control node.

Accordingly, the target device (the transmit side UE and the control node) can receive the first feedback information on the first resource.

In the resource indication method provided in the embodiments of this disclosure, because the receive side UE can receive, from the control node or the transmit side UE, information indicating the transmission resource (the first resource) used to carry feedback information, the receive side UE may not need to allocate the first resource. Thus, the conflict between the resource (that is, the second resource) for transmitting the control information and/or the service data and the first resource can be avoided.

Figure 3:
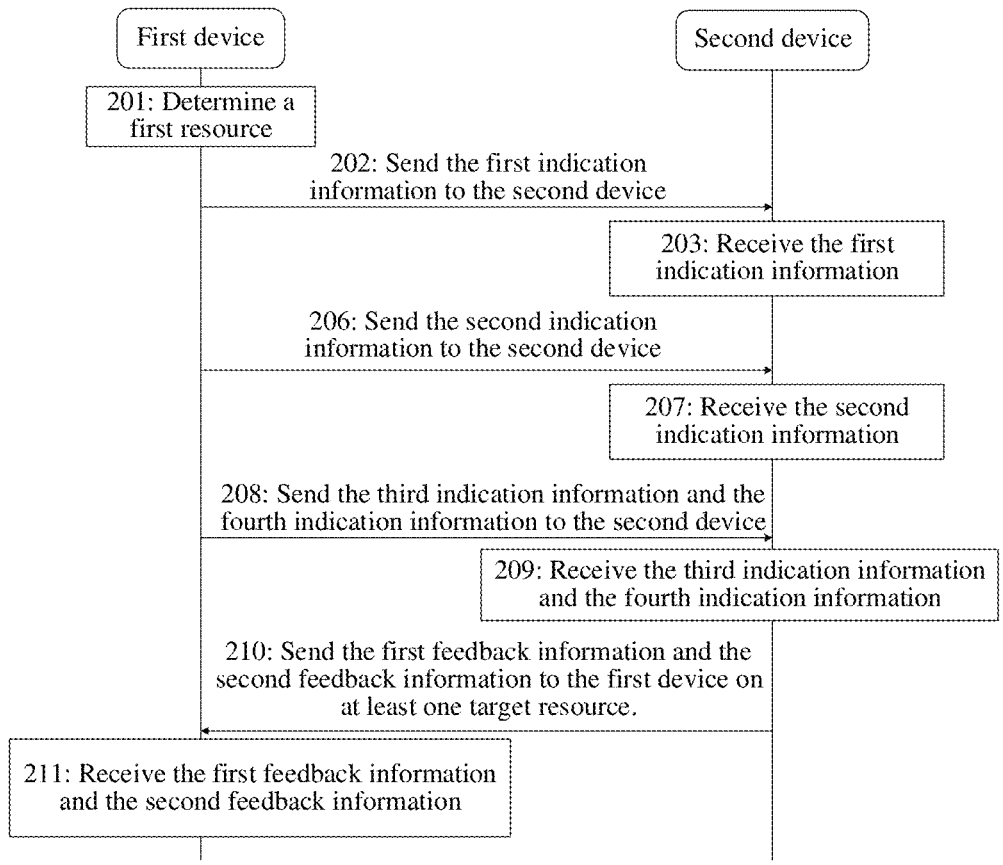
FIG. 3 is a second schematic diagram of a resource indication method according to an embodiment of this disclosure.

Optionally, with reference to FIG. 2, as shown in FIG. 3, the resource indication method provided in the embodiments of this disclosure may further include the following steps 206 to 211.

In step 206, the first device sends the second indication information to the second device.

In step 207, The second device receives the second indication information.

In step 208, The first device sends the third indication information and the fourth indication information to the second device.

In step 209, The second device receives the third indication information and the fourth indication information.

In step 210, The second device sends the first feedback information and the second feedback information to the first device on at least one target resource.

In step 211, The first device receives the first feedback information and the second feedback information.

The third indication information can be used to indicate the third resource, and the fourth indication information is used to indicate the fourth resource. The third resource may be used for transmitting the second feedback information. The fourth resource can be used for transmitting at least one of second control information or second service data. The third resource is different from the fourth resource. The third resource may include at least one of the following: a target resource of a sidelink channel or a target resource of an uplink channel. The third resource is the same as at least one target resource in the first resource.

It should be noted that the embodiments of this disclosure do not limit the execution sequence of the steps in FIG. 3, and details can be determined according to a usage requirement.

Optionally, in the embodiments of this disclosure, the third resource is the same as at least one target resource in the first resource, and this can include at least one of the following: a time domain resource of the third resource is the same as a time domain resource of the first resource, a frequency domain resource of the third resource is the same as a frequency domain resource of the first resource, a spatial domain resource of the third resource is the same as a spatial domain resource of the first resource, or a code domain resource of the third resource is the same as a code domain resource of the first resource.

For example, the first device is transmit side UE, and the second device is receive side UE. First, the transmit side UE can determine the first indication information (the first indication information is used to indicate a PSFCH-1 resource for transmitting the first feedback information), determine the second indication information (the second indication information is used to indicate a PSSCH-1 resource for transmitting the first service data), and send the first indication information and the second indication information to the receive side UE by carrying the first indication information and the second indication information in SCI-1, so that the receive side UE can receive and demodulate the SCI-1, obtain the PSSCH-1 resource and the PSFCH-1 resource, and demodulate data transmitted on the PSSCH-1 resource, and obtain HARQ-ACK-1 feedback information according to whether the demodulation is successful or not. Second, the transmit side UE can determine the third indication information (the third indication information is used to indicate a PSFCH-2 resource for transmitting the second feedback information), determine the fourth indication information (the fourth indication information is used to indicate a PSSCH-2 resource for transmitting the second service data), and send the third indication information and the fourth indication information to the receive side UE by carrying the third indication information and the fourth indication information in SCI-2, so that the receive side UE can receive and demodulate the SCI-2, obtain the PSSCH-2 resource and the PSFCH-2 resource, and demodulate data transmitted on the PSSCH-2 resource, and obtain HARQ-ACK-2 feedback information according to whether the demodulation is successful or not. Then, the receive side UE can construct a HARQ codebook including HARQ-ACK-1 feedback information and HARQ-ACK-2 feedback information, and transmit SFCI information to the transmit side UE on the PSFCH-1 resource (the SFCI information includes the HARQ codebook). In this way, the transmit side UE can determine whether service data transmission is successful according to the HARQ codebook, and then determine whether to retransmit the data.

Optionally, in the embodiments of this disclosure, the first indication information and the second indication information can be carried in the first control channel, and the third indication information and the fourth indication information can be carried in the second control channel. The first control channel further can include a first identifier, and the second control channel further can include a second identifier. The first identifier can be used to indicate the allocated identifier of data transmitted on the second resource, and the second identifier is used to indicate the allocated identifier of data transmitted on the second resource.

It can be understood that the first identifier is carried in the first control channel and the second identifier is carried in the second control channel, so that the receive side UE can determine whether data of each channel is successfully received according to the first identifier and the second identifier, to determine feedback information to be sent to the transmit side UE or the control node.

Optionally, the above allocated identifier can be a serial number of the data (or a data packet). For example, if the second resource is PSSCH-1 and the fourth resource is PSSCH-2, the first identifier can be a serial number 1 and the second identifier can be a serial number 2.

Optionally, the above allocated identifier can be used to indicate the number of data (or data packets) sent by the first device. For example, if the first identifier is 4, it can indicate that the number of data packets sent by the first device is 4.

Optionally, the above allocated identifier can be used to indicate the total number of data (or data packets) sent by the first device. For example, if the first identifier or the second identifier is 8, it can indicate that the total number of data packets sent by the first device is 8.

Optionally, the above allocated identifier can be used to indicate that the data packet is an odd-numbered packet or an even-numbered packet sent by the first device. For example, if the allocated identifier of the first data packet sent by the first device is 1, it can indicate that the first data packet is an odd-numbered packet; if the allocated identifier of the second data packet sent by the first device is 0, it can indicate that the second data packet is an even-numbered packet; if the allocated identifier of the third data packet sent by the first device is 1, it can indicate that the third data packet is an odd-numbered packet; if the allocated identifier of the fourth data packet sent by the first device is 0, it can indicate that the fourth data packet is an even-numbered packet.

In the resource indication method provided in the embodiments of this disclosure, when target resources of resources indicated by multiple pieces of indication information are completely the same or partially the same, because the receive side UE can multiplex multiple pieces of feedback information in the same resource for sending, the transmission efficiency of the communication system can be improved and system overheads can be reduced.

The following describes the four optional implementations of the first device and the second device in the foregoing embodiments through the following implementation 1, implementation 2, implementation 3, and implementation 4 respectively.

Implementation 1

Figure 4:
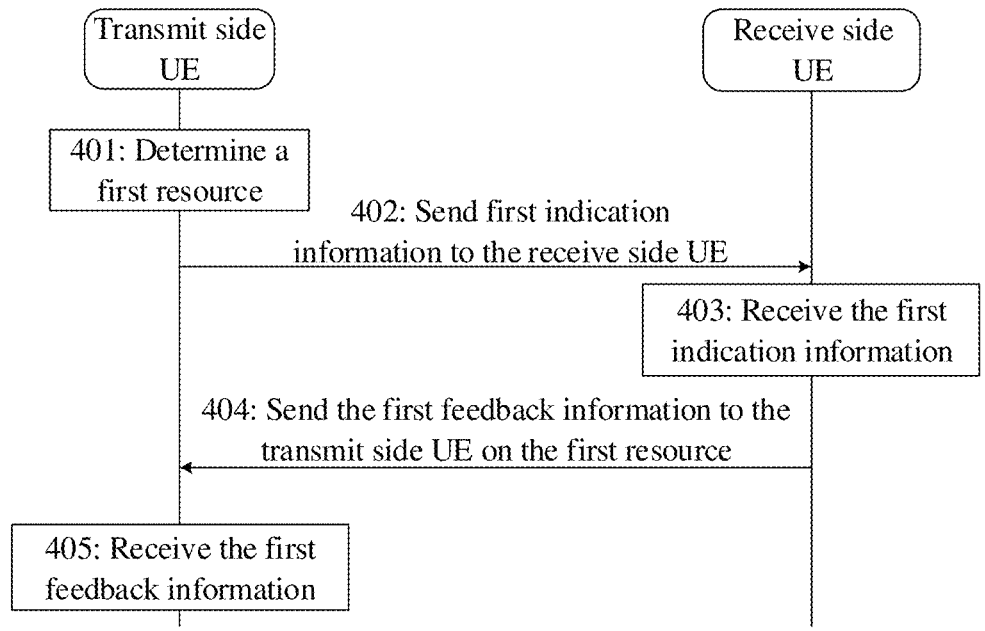
FIG. 4 is a third schematic diagram of a resource indication method according to an embodiment of this disclosure.

This implementation mainly describes a process in which when the transmit side UE and the receive side UE perform sidelink transmission through the autonomous resource selection mode, the transmit side UE allocates the first resource and sends indication information to the receive side UE and the receive side sends feedback information. As shown in FIG. 4, the resource indication method provided in the embodiments of this disclosure may include the following steps 401 to 405.

In step 401, the transmit side UE determines a first resource.

In step 402, the transmit side UE sends first indication information to the receive side UE.

In step 403, the receive side UE receives the first indication information.

In step 404, the receive side UE sends the first feedback information to the transmit side UE on the first resource.

In step 405, the transmit side UE receives the first feedback information.

The first resource may be used for transmitting first feedback information. The first indication information can be used to indicate the first resource.

In this implementation, the first device is transmit side UE, and the second device is receive side UE.

Optionally, in this embodiment of the present disclosure, the first resource may be a target resource (the target resource includes at least one of a time domain resource, a frequency domain resource, a space domain resource, or a code domain resource) of a sidelink channel (for example, a PSCCH, a PSSCH, or a PSFCH).

Optionally, in the embodiments of this disclosure, the first feedback information can be carried in SFCI of the sidelink channel (for example, a PSCCH, a PSSCH, or a PSFCH).

Optionally, in the embodiments of this disclosure, the first indication information can be carried in a PSCCH. Specifically, the first indication information can be carried in PSCCH SCI.

For example, the transmit side UE may allocate a PSFCH resource (that is, the first resource) for transmitting the first feedback information, allocate PSCCH and PSSCH resources (that is, the second resource) for transmitting control information and service data, and send, through the SCI of the PSCCH, indication information for indicating the PSFCH resource and the PSSCH resource to the receive side UE. In this way, the receive side UE can monitor, receive, and demodulate the SCI, obtain the PSFCH resource and the PSSCH resource, demodulate data transmitted on the PSSCH resource, and send, on the PSFCH resource, feedback information indicating whether demodulation is successful to the transmit side UE, so that the transmit side UE can receive the feedback information and determine, according to the feedback information, whether the data needs to be retransmitted.

It should be noted that as shown in FIG. 4 above, an example in which the receive side UE sends the first feedback information to the transmit side UE on the first resource is used for illustration, which does not form any restriction on this disclosure. It can be understood that in actual implementation, the receive side UE may also send the first feedback information to the transmit side UE and the control node on the first resource. This may be specifically determined according to a usage requirement.

In the resource indication method provided in the embodiments of this disclosure, because the transmit side UE can allocate the transmission resource (the first resource) used to carry feedback information, and allocate the resource (that is, the second resource) for transmitting the control information and/or the service data, conflict between the first resource and the second resource can be avoided.

Figure 5:
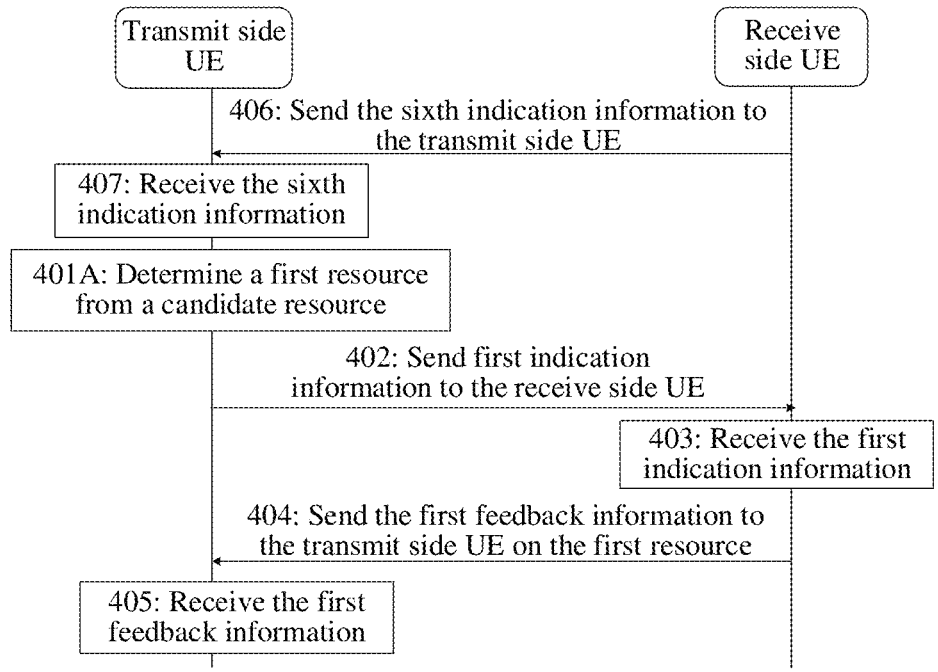
FIG. 5 is a fourth schematic diagram of a resource indication method according to an embodiment of this disclosure.

Optionally, with reference to FIG. 4, as shown in FIG. 5, before step 401, the resource indication method provided in the embodiments of this disclosure may further include the following steps 406 and 407. Correspondingly, the above step 401 can be implemented through step 401A.

In step 406, the receive side UE sends the sixth indication information (which may be referred to as target indication information).

In step 407, the transmit side UE receives the sixth indication information.

In step 401A, the transmit side UE determines a first resource from a candidate resource.

The sixth indication information can be used to indicate the candidate resource. The candidate resource may be a resource indicated by the sixth indication information obtained by the transmit side UE from the receive side UE. The candidate resource can be used to determine the first resource.

For example, assuming that the fourth indication includes a PSFCH-1, a PSFCH-2, a PSFCH-3, a PSFCH-4, and a PSFCH-5, the receive side UE may send the sixth indication information in a broadcast transmission mode, so that the transmit side UE may receive the sixth indication information, select a resource (for example, the PSFCH-2) from the PSFCH-1, the PSFCH-2, the PSFCH-3, the PSFCH-4, and the PSFCH-5, and determine the PSFCH-2 as the first resource.

In the resource indication method provided in the embodiments of the present disclosure, because the transmit side UE can obtain indication information for indicating the candidate resource from the receive side UE, the transmit side UE can determine the first resource that does not conflict with the second resource from the candidate resource, thereby avoiding the conflict between the first resource and the second resource.

Optionally, before step 404, the resource indication method provided in the embodiments of this disclosure may further include the following steps 408 to 411. Correspondingly, the above step 404 can be implemented through step 404A, and the above step 405 can be implemented through step 405A.

In step 408, the transmit side UE sends the second indication information to the receive side UE.

In step 409, the receive side UE receives the second indication information.

In step 410, the transmit side UE sends the third indication information and the fourth indication information to the receive side UE.

In step 411, the receive side UE receives the third indication information and the fourth indication information.

In step 404A, the receive side UE sends the first feedback information and the second feedback information to the transmit side UE on at least one target resource.

In step 405A, the transmit side UE receives the first feedback information and the second feedback information.

For specific descriptions of the second indication information, the third indication information, the fourth indication information, the second feedback information, the first feedback information, and the at least one target resource, reference may be made to the relevant description in the foregoing embodiments. Details are not repeated herein.

In the resource indication method provided in the embodiments of this disclosure, when target resources of resources indicated by multiple pieces of indication information are completely the same or partially the same, because the receive side UE can multiplex multiple pieces of feedback information in the same resource for sending, the transmission efficiency can be improved and system overheads can be reduced.

It should be noted that for related content of step 401 to step 411, refer to related descriptions in the foregoing embodiments. Details are not described herein again.

Implementation 2

Figure 6:
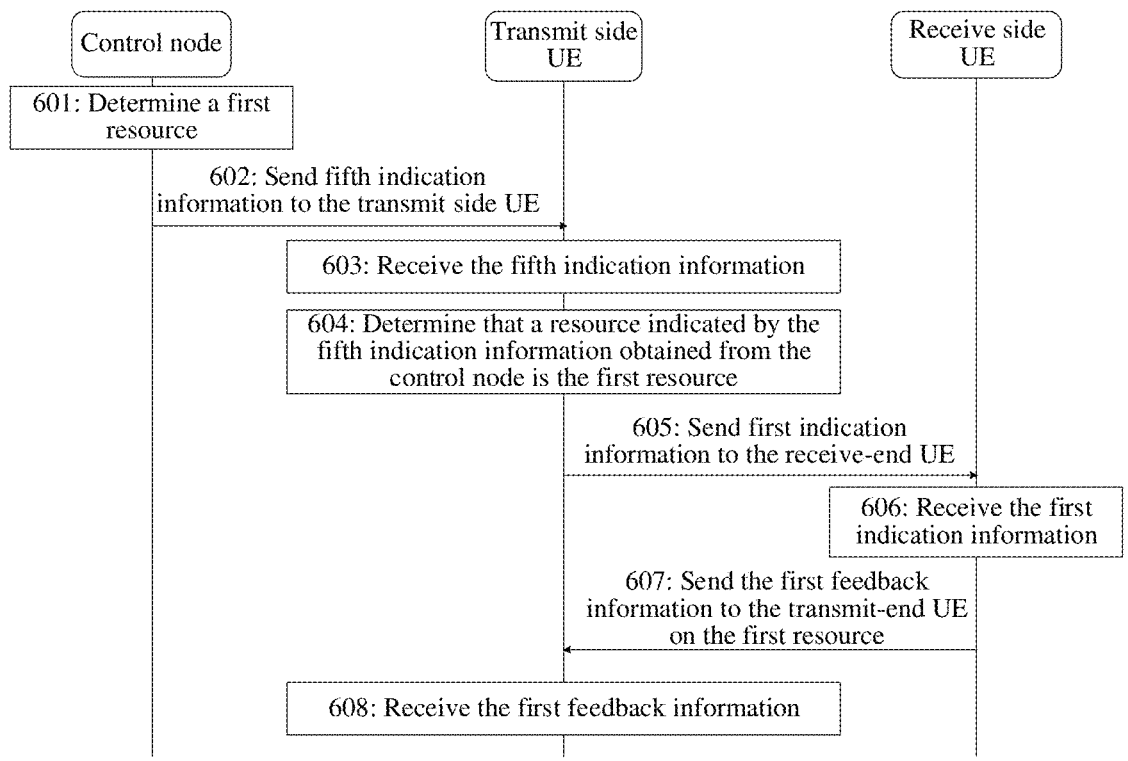
FIG. 6 is a fifth schematic diagram of a resource indication method according to an embodiment of this disclosure.

This implementation mainly describes a process in which when the transmit side UE and the receive side UE perform sidelink transmission through the scheduled resource allocation mode, the control node allocates the first resource and sends indication information to the transmit side UE, so that the transmit side UE forwards the indication information to the receive side UE, and the receive side sends feedback information to the transmit side UE. As shown in FIG. 6, the resource indication method provided in the embodiments of this disclosure may include the following steps 601 to 608.

In step 601, a control node determines a first resource.

In step 602, the control node sends fifth indication information to the transmit side UE.

In step 603, the transmit side UE receives the fifth indication information.

In step 604, the transmit side UE determines that a resource indicated by the fifth indication information obtained from the control node is the first resource.

In step 605, the transmit side UE sends first indication information to the receive side UE.

In step 606, the receive side UE receives the first indication information.

In step 607, the receive side UE sends the first feedback information to the transmit side UE on the first resource.

In step 608, the transmit side UE receives the first feedback information.

In this implementation, for example, the first device is transmit side UE, and the second device is receive side UE. It can be understood that in actual implementation, the first device may be the control node and the second device may be the transmit side UE, that is, the control node may determine the first resource and send the first indication information to the transmit side UE, and then the transmit side UE may send other indication information (for example, fifth indication information) used to indicate the first resource to the receive side UE.

Optionally, in the embodiments of this disclosure, the first resource can be a target resource of the sidelink channel (for example, PSCCH, PSSCH, or PSFCH).

Optionally, in the embodiments of this disclosure, the first feedback information can be carried in SFCI of the sidelink channel (for example, PSCCH, PSSCH, or PSFCH).

Optionally, in the embodiments of this disclosure, the first indication information may be carried in the PSCCH, for example, the first indication information may be carried in the SCI of the PSCCH.

For example, the base station (the control node) may first allocate a PSFCH resource (that is, the first resource) for transmitting the first feedback information, allocate PSCCH and PSSCH resources (that, the second resource) for transmitting control information and service data, and send, through the DCI of the PDCCH, indication information for indicating the PSFCH resource and the PSSCH resource to the transmit side UE. Second, the transmit side UE can receive the DCI, obtain the PSCCH resource, the PSFCH resource, and the PSSCH resource, and send the first indication information through the SCI in the PSCCH. Then, the receive side UE can receive the SCI, obtain the PSFCH resource and the PSSCH resource, demodulate data transmitted on the PSSCH resource, and send, on the PSFCH resource, feedback information indicating whether demodulation is successful to the transmit side UE, so that the transmit side UE can receive the feedback information and determine, according to the feedback information, whether the data needs to be retransmitted.

It should be noted that as shown in FIG. 6 above, an example in which the receive side UE sends the first feedback information to the transmit side UE on the first resource is used for illustration, which does not form any restriction on this disclosure. It can be understood that in actual implementation, the receive side UE may also send the first feedback information to the transmit side UE and the control node on the first resource. This may be specifically determined according to a usage requirement, and is not limited in the embodiments of this disclosure.

In the resource indication method provided in the embodiments of this disclosure, because the control node can allocate the transmission resource (the first resource) used to carry feedback information, and allocate the resource (that is, the second resource) for transmitting the control information and/or the service data, conflict between the first resource and the second resource can be avoided.

Optionally, before step 607, the resource indication method provided in the embodiments of this disclosure may further include the following steps 609 to 613. Correspondingly, the above step 607 can be implemented through step 607A, and the above step 608 can be implemented through step 608A.

In step 609, the transmit side UE sends the second indication information to the receive side UE.

In step 610, the receive side UE receives the second indication information.

In step 611, the transmit side UE determines that the resources indicated by the sixth indication information obtained from the control node are the third resource and the fourth resource.

In step 612, the transmit side UE sends the third indication information and the fourth indication information to the receive side UE.

In step 613, the receive side UE receives the third indication information and the fourth indication information.

In step 607A, the receive side UE sends the first feedback information and the second feedback information to the transmit side UE on at least one target resource.

In step 608A, the transmit side UE receives the first feedback information and the second feedback information.

For specific descriptions of the second indication information, the third indication information, the fourth indication information, the first feedback information, the second feedback information, and the at least one target resource, reference may be made to the relevant description in the foregoing embodiments. Details are not repeated herein.

In the resource indication method provided in the embodiments of this disclosure, when target resources of resources indicated by multiple pieces of indication information are completely the same or partially the same, because the receive side UE can multiplex multiple pieces of feedback information in the same resource for sending, the transmission efficiency can be improved and system overheads can be reduced.

It should be noted that for related content of step 601 to step 613, refer to related descriptions in the foregoing embodiments. Details are not described herein again.

Implementation 3

Figure 7:
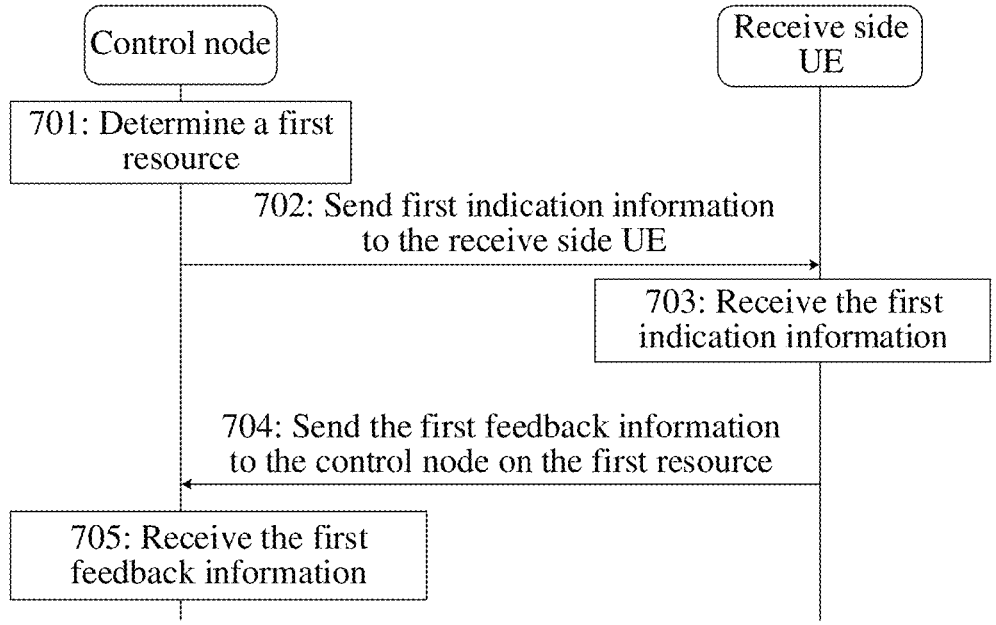
FIG. 7 is a sixth schematic diagram of a resource indication method according to an embodiment of this disclosure.

This implementation mainly describes a process in which when the transmit side UE and the receive side UE perform sidelink transmission through the scheduled resource allocation mode, the control node allocates the first resource and sends indication information to the receive side UE, so that the receive side may send feedback information to the control node. As shown in FIG. 7, the resource indication method provided in the embodiments of this disclosure may include the following steps 701 to 705.

In step 701, a control node determines a first resource.

In step 702, the control node sends first indication information to the receive side UE.

In step 703, the receive side UE receives the first indication information.

In step 704, the receive side UE sends the first feedback information to the control node on the first resource.

In step 705, the control node receives the first feedback information.

In this implementation, the first device is the control node, and the second device is the receive side UE.

Optionally, in the embodiments of this disclosure, when the control node is UE, the first resource may be a target resource of a sidelink channel (such as a PSCCH, a PSSCH, or a PSFCH); when the control node is a network side device, the first resource may be a target resource of an uplink channel (such as a PUCCH or a PUSCH).

Optionally, in the embodiments of this disclosure, when the control node is UE, the first feedback information can be carried in the SFCI of a sidelink channel (such as PSCCH, PSSCH, or PSFCH); when the control node is a network side device, the first feedback information can be carried in the UCI of the uplink channel (such as PUCCH).

Optionally, in the embodiments of this disclosure, when the control node is UE, the first indication information may be carried in the PSCCH, for example, the first indication information may be carried in the SCI of the PSCCH; when the control node is a network side device, the first indication information may be carried in the PDCCH, for example, the first indication information may be carried in the DCI of the PDCCH.

For example, the base station (that is, the control node) may first allocate a PSFCH resource (that is, the first resource) for transmitting the first feedback information, allocate PSCCH and PSSCH resources (that is, the second resource) for transmitting control information and service data, and send, through the DCI of the PDCCH, first indication information for indicating the PSFCH resource and the PSSCH resource to the receive side UE. Then, the receive side UE can receive the DCI, obtain the PSFCH resource and the PSSCH resource, demodulate data transmitted on the PSSCH resource, and send, on the PSFCH resource, feedback information indicating whether demodulation is successful to the base station. In this way, the base station can receive the feedback information.

For another example, the base station (that is, the control node) may first allocate a PSFCH resource (that is, the first resource) for transmitting the first feedback information, and send, through the DCI of the PDCCH, first indication information for indicating the PSFCH resource to the receive side UE. In this way, the receive side UE can receive the DCI and obtain the PSFCH resource. In addition, the receive side UE can also receive the PSSCH resource that is used to transmit service data and sent by the transmitting end UE, demodulate the data transmitted on the PSSCH resource, and send, on the PSFCH resource, feedback information indicating whether demodulation is successful to the base station. In this way, the base station can receive the feedback information.

It should be noted that as shown in FIG. 7 above, an example in which the receive side UE sends first feedback information to the control node on the first resource is used for illustration, which does not form any restriction on this disclosure. It can be understood that in actual implementation, the receive side UE may also send the first feedback information to the transmit side UE and the control node on the first resource. This may be specifically determined according to a usage requirement, and is not limited in the embodiments of this disclosure.

In the resource indication method provided in the embodiments of this disclosure, because the control node can allocate the transmission resource (the first resource) used to carry feedback information, and allocate the resource (that is, the second resource) for transmitting the control information and/or the service data, conflict between the first resource and the second resource can be avoided.

Optionally, after step 705, the resource indication method provided in this embodiment of this disclosure may further include the following steps 706 and 707.

In step 706, the control node sends first feedback information to the transmit side UE.

In step 707, the transmit side UE receives the first feedback information.

In the resource indication method provided in the embodiments of the present disclosure, because the control node can send feedback information to the transmit side UE, the transmit side UE can determine, according to the first feedback information, whether the service data or the like is sent successfully, and then determine whether the service data or the like needs to be retransmitted.

Optionally, before step 704, the resource indication method provided in the embodiments of this disclosure may further include the following steps 708 to 711. Correspondingly, the above step 704 can be implemented through step 704A, and the above step 705 can be implemented through step 705A.

In step 708, the control node sends the second indication information to the receive side UE.

In step 709, the receive side UE receives the second indication information.

In step 710, the control node sends the third indication information and the fourth indication information to the receive side UE.

In step 711, the receive side UE receives the third indication information and the fourth indication information.

In step 704A, the receive side UE sends the first feedback information and the second feedback information to the control node on at least one target resource.

In step 705A, the control node receives the first feedback information and the second feedback information.

For specific descriptions of the second indication information, the third indication information, the fourth indication information, the first feedback information, the second feedback information, and the at least one target resource, reference may be made to the relevant description in the foregoing embodiments. Details are not repeated herein.

In the resource indication method provided in the embodiments of this disclosure, when target resources of resources indicated by multiple pieces of indication information are completely the same or partially the same, because the receive side UE can multiplex multiple pieces of feedback information in the same resource for sending, the transmission efficiency can be improved and system overheads can be reduced.

It should be noted that for related content of step 701 to step 711, refer to related descriptions in the foregoing embodiments. Details are not described herein again.

Implementation 4

Figure 8:
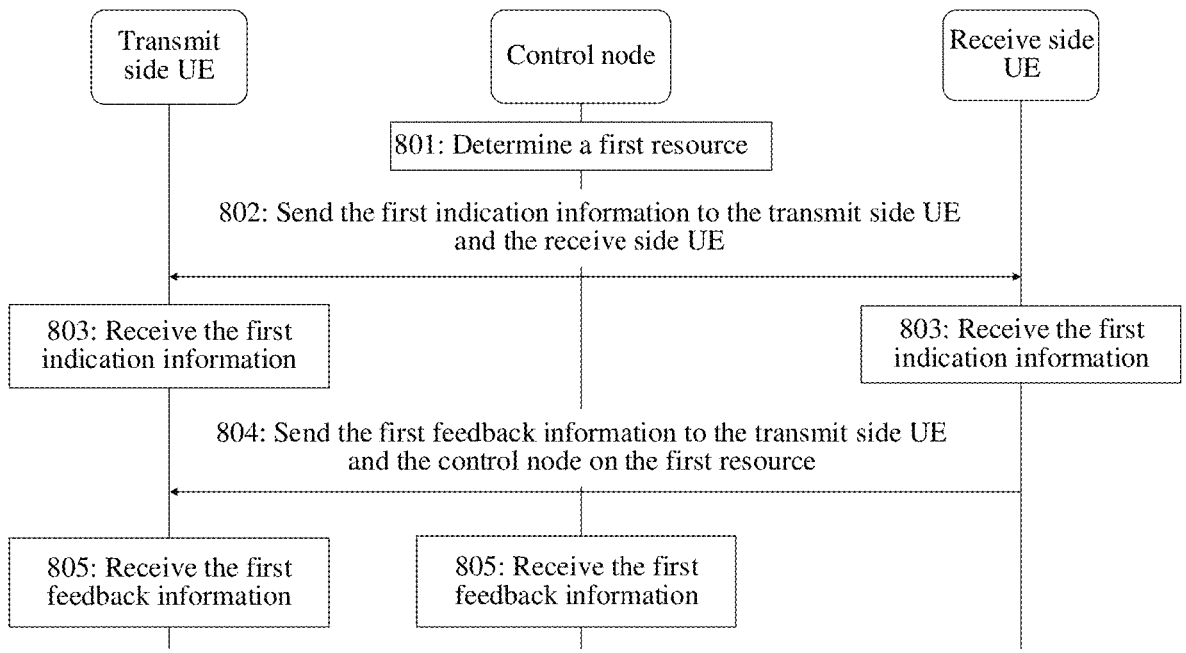
FIG. 8 is a seventh schematic diagram of a resource indication method according to an embodiment of this disclosure.

This implementation mainly describes a process in which when the transmit side UE and the receive side UE perform sidelink transmission through the scheduled resource allocation mode, the control node allocates the first resource and sends indication information to the transmit side UE and the receive side UE, so that the receive side UE may send feedback information to the control node and the transmit side UE. As shown in FIG. 8, the resource indication method provided in the embodiments of this disclosure may include the following steps 801 to 805.

In step 801, a control node determines a first resource.

In step 802, the control node sends the first indication information to the transmit side UE and the receive side UE.

In step 803, the transmit side UE and the receive side UE receive the first indication information.

In step 804, the receive side UE sends the first feedback information to the transmit side UE and the control node on the first resource.

In step 805, the transmit side UE and the control node receive the first feedback information.

In this implementation, the first device is the control node, and the second device is the transmit side UE and the receive side UE.

Optionally, in the embodiments of this disclosure, the first resource may be a target resource of a sidelink channel (such as a PSCCH, a PSSCH, or a PSFCH); or the first resource may be a target resource of an uplink channel (such as a PUCCH or a PUSCH).

Optionally, in the embodiments of this disclosure, the first feedback information can be carried in SFCI of the sidelink channel (for example, a PSCCH, a PSSCH, or a PSFCH); or the first feedback information may be carried in the UCI of the uplink channel (for example, a PUCCH).

Optionally, in the embodiments of this disclosure, the first indication information may be carried in the PSCCH, for example, the first indication information may be carried in the SCI of the PSCCH; or the first indication information may be carried in the PDCCH, for example, the first indication information may be carried in the DCI of the PDCCH.

It should be noted that as shown in FIG. 8 above, an example in which the receive side UE sends first feedback information to the transmit side UE and the control node on the first resource is used for illustration, which does not form any restriction on this disclosure. It can be understood that in actual implementation, the receive side UE may also send the first feedback information to the transmit side UE on the first resource; or may send the first feedback information to the control node, and the control node forwards the feedback information to the transmit side UE. This may be specifically determined according to a usage requirement, and is not limited in the embodiments of this disclosure.

In the resource indication method provided in the embodiments of this disclosure, because the control node can allocate the transmission resource (the first resource) used to carry feedback information, and allocate the resource (that is, the second resource) for transmitting the control information and/or the service data, conflict between the first resource and the second resource can be avoided.

Optionally, before step 804, the resource indication method provided in the embodiments of this disclosure may further include the following steps 806 to 809. Correspondingly, the above step 804 can be implemented through step 804A, and the above step 805 can be implemented through step 805A.

In step 806, the control node sends second indication information to the transmit side UE and the receive side UE.

In step 807, the transmit side UE and the receive side UE receive the second indication information.

In step 808, the control node sends the third indication information and the fourth indication information to the transmit side UE and the receive side UE.

In step 809, the transmit side UE and the receive side UE receive the third indication information and the fourth indication information.

In step 804A, the receive side UE sends the first feedback information and the second feedback information to the transmit side UE and the control node on the first resource.

In step 805A, the transmit side UE and the control node receive the first feedback information and the second feedback information.

For specific descriptions of the second indication information, the third indication information, the fourth indication information, the first feedback information, the second feedback information, and the at least one target resource, reference may be made to the relevant description in the foregoing embodiments. Details are not repeated herein.

In the resource indication method provided in the embodiments of this disclosure, when target resources of resources indicated by multiple pieces of indication information are completely the same or partially the same, because the receive side UE can multiplex multiple pieces of feedback information in the same resource for sending, the transmission efficiency can be improved and system overheads can be reduced.

It should be noted that for related content of step 801 to step 809, refer to related descriptions in the foregoing embodiments. Details are not described herein again.

Figure 9:
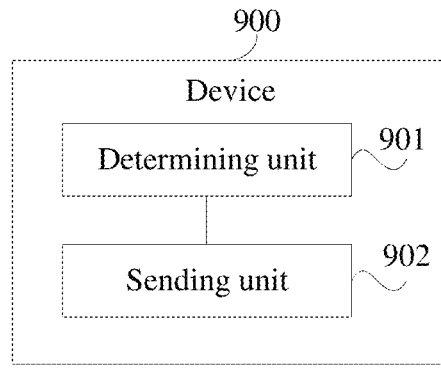
FIG. 9 is a first schematic structural diagram of a device according to an embodiment of this disclosure.

FIG. 9 is a possible schematic structural diagram of a device according to an embodiment of this disclosure. As shown in FIG. 9, a device 900 provided in this embodiment of this disclosure may be applied to a sidelink transmission process, and may include a determining unit 901 and a sending unit 902. The determining unit 901 is configured to determine a first resource, where the first resource is used for transmitting first feedback information; and the sending unit 902 is configured to send first indication information to a second device, where the first indication information is used to indicate the first resource.

Optionally, in the embodiments of this disclosure, the first resource may include at least one of the following: a target resource of a sidelink channel or a target resource of an uplink channel. The sidelink channel is a physical sidelink control channel, a physical sidelink shared channel, or a physical sidelink feedback channel, the uplink channel is a physical uplink control channel or a physical uplink shared channel, and the target resource includes at least one of a time domain resource, a frequency domain resource, a spatial domain resource, or a code domain resource.

Optionally, in the embodiments of this disclosure, the sending unit 902 may be specifically configured to send the first control channel to the second device. The first control channel may include the first indication information. The first control channel may include any one of the following: a physical sidelink control channel and a physical downlink control channel.

Figure 10:
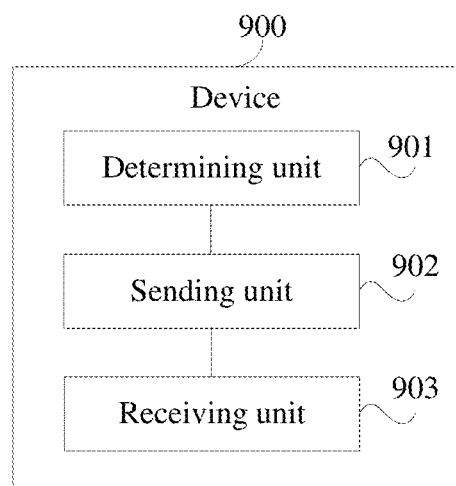
FIG. 10 is a second schematic structural diagram of a device according to an embodiment of this disclosure.

Optionally, with reference to FIG. 9, as shown in FIG. 10, the device provided in this embodiment of this disclosure may further include a receiving unit 903. The receiving unit 903 may be configured to receive the first feedback information on the first resource after the sending unit 902 sends the first indication information to the second device.

Optionally, in the embodiments of this disclosure, the sending unit 902 may be further configured to: send the second indication information to the second device. The second indication information can be used to indicate the second resource. The second resource can be used for transmitting at least one of first control information or first service data. The second resource is different from the first resource.

Optionally, in this embodiment of the present disclosure, the sending unit 902 may also be configured to send the third indication information and the fourth indication information to the second device. The receiving unit 903 may be specifically configured to: after the first indication information, the second indication information, the third indication information, and the fourth indication information are sent to the second device, receive the first feedback information and the second feedback information on the at least one target resource. The third indication information can be used to indicate the third resource, and the fourth indication information is used to indicate the fourth resource. The third resource can be used for transmitting the second feedback information. The fourth resource can be used for transmitting at least one of second control information or second service data. The third resource is different from the fourth resource. The third resource includes at least one of the following: a target resource of a sidelink channel or a target resource of an uplink channel. The third resource is the same as at least one target resource in the first resource.

Optionally, in the embodiments of this disclosure, the first indication information and the second indication information may be carried in the first control channel. The third indication information and the fourth indication information can be carried in the second control channel. The first control channel may also include the first identifier. The second control channel further can include a second identifier. The first identifier can be used to indicate the allocated identifier of data transmitted on the second resource, and the second identifier can be used to indicate the allocated identifier of data transmitted on the fourth resource.

Optionally, the device in the embodiment of the present disclosure may be the transmit side UE, and the second device may be the receive side UE; or the device in the embodiment of the present disclosure may be the control node, and the second device may include at least one of the transmit side UE or the receive side UE.

Optionally, the device in the embodiment of the present disclosure may be transmit side UE, and the second device is receive side UE. The determining unit 901 can be specifically configured to determine that a resource indicated by the fifth indication information obtained from the control node is the first resource.

Optionally, the device in the embodiment of the present disclosure may be transmit side UE, and the second device is receive side UE. The determining unit 901 can be specifically configured to determine the first resource from the candidate resource, where the candidate resource may be a resource indicated by the sixth indication information obtained from the receive side UE.

Optionally, the device in the embodiment of the present disclosure may be a control node, and the second device includes at least one of the transmit side UE or the receive side UE. The receiving unit 903 may be configured to: after the sending unit 902 sends the first indication information to the second device, receive, on the first resource, the first feedback information sent by the receive side UE. The sending unit 902 may be also configured to send first feedback information to the transmit side UE.

The device provided in this embodiment of this disclosure can implement the processes that are implemented by the device in the foregoing method embodiments. To avoid repetition, details are not described herein again.

The embodiments of this disclosure provide a device. The device can determine a transmission resource (the first resource) for carrying feedback information. Therefore, in a possible case, if the device is transmit side UE, the transmit side UE further can allocate a resource (the second resource) for transmitting control information and/or service data. This can avoid that the resource for transmitting the control information and/or the service data conflicts with the resource for transmitting feedback information. In another possible case, if the device is a control node, the control node further can allocate the resource (the second resource) for transmitting the control information and/or the service data for the transmit side UE. This can avoid that the resource for transmitting the control information and/or the service data conflicts with the resource for transmitting feedback information. In this way, the device provided in the embodiments of this disclosure can avoid that the resource for transmitting the control information and/or the service data conflicts with the resource for transmitting feedback information.

Figure 11:
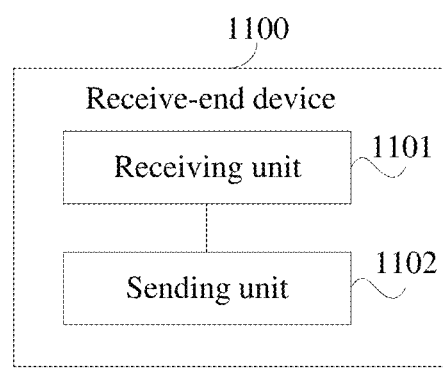
FIG. 11 is a schematic structural diagram of receive side UE according to an embodiment of this disclosure.

FIG. 11 is a possible schematic structural diagram of a device (that is, receive side UE) according to an embodiment of this disclosure. As shown in FIG. 11, a device 1100 provided in this embodiment of this disclosure may be applied to a sidelink transmission process, and may include a receiving unit 1101 and a sending unit 1102. The receiving unit 1101 is configured to receive first indication information, where the first indication information is used to indicate a first resource, and the first resource is used for transmitting first feedback information; and the sending unit 1102 is configured to send the first feedback information to a target device on the first resource, and the target device includes at least one of transmit side UE or a control node.

Optionally, in the embodiments of this disclosure, the first resource may include at least one of the following: a target resource of a sidelink channel or a target resource of an uplink channel. The sidelink channel may be a physical sidelink control channel, a physical sidelink shared channel, or a physical sidelink feedback channel, the uplink channel may be a physical uplink control channel or a physical uplink shared channel, and the target resource may include at least one of a time domain resource, a frequency domain resource, a spatial domain resource, or a code domain resource.

Optionally, in the embodiments of this disclosure, the receiving unit 1101 may be specifically configured to receive the first control channel. The first control channel may include the first indication information, and the first control channel includes any one of the following: a physical sidelink control channel and a physical downlink control channel.

Optionally, in the embodiments of this disclosure, the receiving unit 1101 may be further configured to receive the second indication information. The second indication information can also be used to indicate a second resource, the second resource can be used for transmitting at least one of first control information or first service data, and the second resource is different from the first resource.

Optionally, in this embodiment of the present disclosure, the receiving unit 1101 may also be configured to receive the third indication information and the fourth indication information on the first resource. The sending unit 1102 may also be configured to send the first feedback information and the second feedback information to the target device on at least one target resource. The third indication information may be used to indicate the third resource, the fourth indication information may be used to indicate the fourth resource, the third resource is used to transmit the second feedback information, and the fourth resource is used to transmit at least one of the second control information or second service data, the third resource is different from the fourth resource, and the third resource includes at least one of the following: a target resource of a sidelink channel or a target resource of an uplink channel, and the third resource is the same as at least one target resource in the first resource.

Optionally, in the embodiments of this disclosure, the first indication information and the second indication information are carried in the first control channel, and the third indication information and the fourth indication information are carried in the second control channel. The first control channel further can include a first identifier, and the second control channel further can include a second identifier. The first identifier can be used to indicate the allocated identifier of data transmitted on the second resource, and the second identifier can be used to indicate the allocated identifier of data transmitted on the fourth resource.

Optionally, in this embodiment of the present disclosure, the sending unit 1102 may also be configured to send the target indication information before the receiving unit 1101 receives the first indication information. The target indication information may be used to indicate a candidate resource, and the candidate resource may be used to determine the first resource.

The device provided in this embodiment of this disclosure can implement the processes that are implemented by the device in the foregoing method embodiments. To avoid repetition, details are not described herein again.

The embodiments of this disclosure provide a device (that is, the receive side UE). Because the receive side UE can receive, from the control node or the transmit side UE, information indicating the transmission resource (the first resource) used to carry feedback information, the receive side UE may not need to allocate the first resource. Thus, the conflict between the resource for transmitting the control information and/or the service data and the first resource for transmitting feedback information can be avoided.

Figure 12:
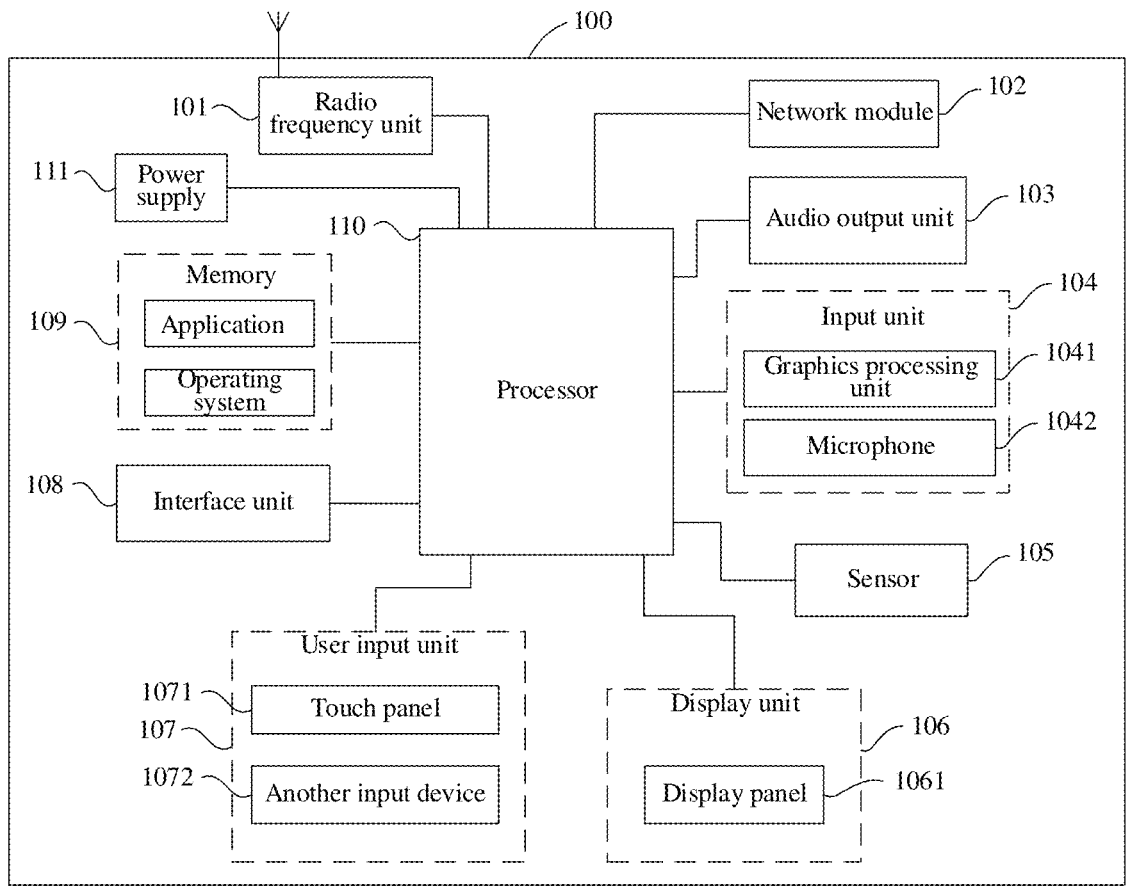
FIG. 12 is a schematic diagram of hardware of a terminal device according to an embodiment of this disclosure.

FIG. 12 is a schematic structural diagram of hardware of a terminal device according to an embodiment of this disclosure; As shown in FIG. 12, the terminal device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and the like. A person skilled in the art may understand that the structure of the terminal device shown in FIG. 12 does not constitute a limitation to the terminal device. The terminal device may include more or fewer components than that shown in the figure, or a combination of some components, or an arrangement of different components. In this embodiment of this disclosure, the terminal device includes but is not limited to a mobile phone, a tablet computer, a notebook computer, a palmtop computer, a vehicle-mounted terminal, a wearable device, a pedometer, or the like.

It should be noted that the terminal device shown in FIG. 12 may be the transmit side UE or the receive side UE in the communication system shown in FIG. 1.

When the terminal device shown in FIG. 12 is the transmit side UE, the processor 110 is configured to determine a first resource, where the first resource is used for transmitting first feedback information; and the radio frequency unit 101 is configured to send first indication information to a second device, where the first indication information is used to indicate the first resource.

The embodiments of this disclosure provide a terminal device (that is, the transmit side UE). Because the transmit side UE can determine the transmission resource (the first resource) used to carry feedback information, and allocate the resource (that is, the second resource) for transmitting the control information and/or the service data, the conflict between the resource for transmitting the control information and/or the service data and the resource for transmitting feedback information can be avoided.

When the terminal device shown in FIG. 12 is the receive side UE, the radio frequency unit 101 is configured to receive first indication information, where the first indication information is used to indicate a first resource, and the first resource is used for transmitting first feedback information; and send the first feedback information to a target device on the first resource, and the target device includes at least one of transmit side UE or a control node.

The embodiments of this disclosure provide a terminal device (that is, the receive side UE). Because the receive side UE can receive, from the control node or the transmit side UE, information indicating the transmission resource (the first resource) used to carry feedback information, the receive side UE may not need to allocate the first resource. Thus, the conflict between the resource for transmitting the control information and/or the service data and the first resource for transmitting feedback information can be avoided.

It should be understood that, in this embodiment of this disclosure, the radio frequency unit 101 may be configured to receive and transmit information, or receive and transmit signals during a call. For example, the radio frequency unit receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device by using a wireless communications system and network.

The terminal device provides a user with wireless broadband Internet access through the network module 102, for example, helps the user send and receive emails, browse web pages, and access streaming media.

The audio output unit 103 can convert audio data received by the radio frequency unit 101 or the network module 102 or stored in the memory 109 into an audio signal, and output the audio signal as sound. In addition, the audio output unit 103 may further provide audio output (for example, call signal receiving sound or message receiving sound) related to a specific function performed by the terminal device 100. The audio output unit 103 includes a loudspeaker, a buzzer, a receiver, and the like.

The input unit 104 is configured to receive audio or video signals. The input unit 104 may include a graphics processing unit (Graphics Processing Unit, GPU) 1041 and a microphone 1042. The graphics processing unit 1041 is configured to process image data of a static picture or a video obtained by an image capture apparatus (for example, a camera) in video capture mode or image capture mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive a sound and can process such sound into audio data. The audio data obtained through processing may be converted, in a telephone call mode, into a format that can be sent to a mobile communications base station via the radio frequency unit 101 for output.

The terminal device 100 further includes at least one sensor 105, such as an optical sensor, a motion sensor, and other sensors. The light sensor includes an ambient light sensor and a proximity sensor. The ambient light sensor can adjust a brightness of a display panel 1061 based on a brightness of ambient light. The proximity sensor can close the display panel 1061 and/or backlight when the terminal device 100 moves to an ear. As a type of motion sensor, an accelerometer sensor may detect an acceleration value in each direction (generally, three axes), and detect a value and a direction of gravity when the accelerometer sensor is static, and may be configured to recognize a terminal posture (such as switching between landscape and portrait modes, a related game, or magnetometer posture calibration), and perform a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 106 is configured to display information entered by a user or information provided for a user. The display unit 106 may include the display panel 1061, and the display panel may be configured in a form of a liquid crystal display (Liquid Crystal Display, LCD), an organic light-emitting diode (Organic Light-Emitting Diode, OLED), or the like.

The user input unit 107 may be configured to receive input numeral or character information, and generate key signal input related to user setting and function control of the terminal device. The user input unit 107 includes a touch panel 1071 and another input device 1072. The touch panel 1071, also called a touch screen, may collect a touch operation of the user on or near the touch panel 1071 (for example, an operation performed by the user on or near the touch panel 1071 by using any suitable object or accessory such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be implemented by using a plurality of types such as a resistive type, a capacitive type, an infrared ray, and a surface acoustic wave. In addition to the touch panel 1071, the user input unit 107 may further include the other input devices 1072. The other input devices 1072 may include, but are not limited to, a physical keyboard, functional keys (for example, a volume control key and a switch key), a trackball, a mouse, and a joystick. Details are not described herein again.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 12, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, an earphone port, and the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 109 may include a high-speed random access memory, and may further include a non-volatile memory such as at least one magnetic disk storage component, a flash memory component, or another volatile solid-state storage component.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, the processor 110 may integrate an application processor and a modem processor. This application processor mainly deals with an operating system, a user interface, and an application program. The modem processor mainly deals with wireless communication. It can be understood that the above-mentioned modem processor may not be integrated in the processor 110.

The terminal device 100 may further include a power supply 111 (for example, a battery) that supplies power to various components. Optionally, the power supply 111 may be logically connected to the processor 110 by using a power supply management system, to perform functions of managing charging, discharging, and power consumption by using the power supply management system.

In addition, the terminal device 100 includes some function modules not shown. Details are not described herein.

Figure 13:
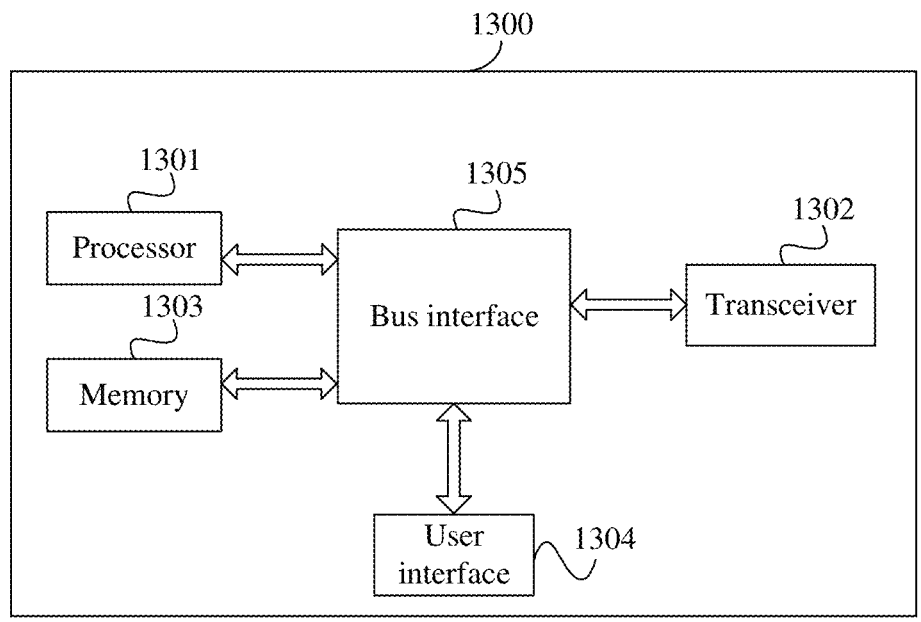
FIG. 13 is a schematic diagram of hardware of a network side device according to an embodiment of this disclosure.

FIG. 13 is a schematic diagram of hardware of a network side device according to an embodiment of this disclosure. The device 1300 may specifically be a control node. The control node 1300 includes a processor 1301, a transceiver 1302, a memory 1303, a user interface 1304, and a bus interface 1305. The processor 1301 is configured to determine a first resource, where the first resource may be used for transmitting first feedback information; and send first indication information to a second device, where the first indication information may be used to indicate the first resource.

It should be noted that the control node shown in FIG. 13 may be the network side device in the communication system shown in FIG. 1.

The embodiments of this disclosure provide a network side device. The device can determine a transmission resource (the first resource) for carrying feedback information, the control node can allocate the resource (the second resource) for transmitting the control information and/or the service data for the transmit side UE. This can avoid that the resource for transmitting the control information and/or the service data conflicts with the resource for transmitting feedback information. In this way, the device provided in the embodiments of this disclosure can avoid that the resource for transmitting the control information and/or the service data conflicts with the resource for transmitting feedback information.

In this embodiment of the present invention, in FIG. 13, a bus architecture may include any quantity of interconnected buses and bridges, and is specifically linked by various circuits of one or more processors represented by the processor 1301 and a memory represented by the memory 1303. The bus architecture may further link various other circuits such as a peripheral device, a voltage regulator, and a power management circuit. These are well known in the art, and therefore are not further described in the embodiments of the present invention. The bus interface 1305 provides an interface. The transceiver 1302 may include a plurality of elements, that is, include a transmitter and a receiver, and provide units for communication with various other apparatuses on a transmission medium. For different UE, the user interface 1304 may alternatively be an interface for externally and internally connecting required equipment. The connected equipment includes but is not limited to a keypad, a display, a speaker, a microphone, a joystick, and the like. The processor 1301 is responsible for management of a bus architecture and general processing. The memory 1303 may store data used when the processor 1301 performs an operation.

In addition, the control node 1300 may further include some functional modules not shown. Details are not described herein again.

Optionally, an embodiment of this disclosure further provides a device, including the processor 110 and the memory 109 that are shown in FIG. 12, and a computer program stored in the memory 109 and executable on the processor 110, where the computer program, when executed by the processor 110, implements the processes of the foregoing method embodiments, and the same technical effects can be achieved. To avoid repetition, details are not described herein again.

Optionally, an embodiment of this disclosure further provides a device, including the processor 1301 and the memory 1303 that are shown in FIG. 13, and a computer program stored in the memory 1303 and executable on the processor 1301, where the computer program, when executed by the processor 1301, implements the processes of the foregoing method embodiments, and the same technical effects can be achieved. To avoid repetition, details are not described herein again.

An embodiment of this disclosure further provides a non-transitory computer-readable storage medium. The non-transitory computer-readable storage medium stores a computer program, and when executing the computer program, a processor implements the foregoing processes of the foregoing method embodiments and a same technical effect can be achieved. To avoid repetition, details are not described herein again. The non-transitory computer-readable storage medium may be a read-only memory (ROM), a random access memory (RAM), a magnetic disk, a compact disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing specific implementations. The foregoing specific implementations are merely schematic instead of restrictive. Under enlightenment of this disclosure, a person of ordinary skills in the art may make many forms without departing from the protection scope of aims of this disclosure and claims, all of which fall within the protection of this disclosure.

What is claimed is:

1. A resource indication method, applied to a sidelink transmission process, the method comprising:
   determining, by a first device, a first resource, wherein the first resource is used for transmitting first feedback information; and
   sending, by the first device, first indication information to a second device, wherein the first indication information is used to indicate the first resource; wherein
   the first resource comprises at least one of a target resource of a sidelink channel or a target resource of an uplink channel, and the target resource comprising at least one of a spatial domain resource or a code domain resource; and
   after the sending, by the first device, first indication information to the second device, the method further comprises:
   receiving, by the first device, the first feedback information on the first resource, the first feedback information being carried in sidelink feedback control information (SFCI) in the sidelink channel;
   wherein:
   the sending, by the first device, the first indication information to the second device, comprises sending, by the first device, a first control channel to the second device, the first control channel comprising the first indication information, second indication information and a first identifier;
   the second indication information is used to indicate a second resource, the second resource is used for transmitting at least one of first control information or first service data, and the second resource is different from the first resource; and
   the first identifier is used to indicate an allocated identifier of data or data packet transmitted on the second resource, and the allocated identifier is used to indicate at least one of:
   a serial number of the data or the data packet;
   a number of the data or the data packet sent by the first device;
   a total number of the data or the data packet sent by the first device; or
   the data packet is an odd-numbered packet or an even-numbered packet sent by the first device.

2. The method according to claim 1, wherein the sidelink channel is a physical sidelink control channel, a physical sidelink shared channel, or a physical sidelink feedback channel, the uplink channel is a physical uplink control channel or a physical uplink shared channel, and the target resource further comprises at least one of a time domain resource, or a frequency domain resource.

3. The method according to claim 1, wherein
the first control channel comprises any one of: a physical sidelink control channel and a physical downlink control channel.

4. The method according to claim 1, further comprising:
sending, by the first device, third indication information and fourth indication information to the second device, wherein the third indication information is used to indicate the third resource, the fourth indication information is used to indicate the fourth resource, the third resource is used to transmit the second feedback information, and the fourth resource is used to transmit at least one of the second control information or second service data, the third resource is different from the fourth resource, and the third resource comprises at least one of: the target resource of the sidelink channel or the target resource of the uplink channel, and the third resource is the same as at least one target resource in the first resource; and
after the first device sends the first indication information, the second indication information, the third indication information, and the fourth indication information to the second device, receiving, by the first device, the first feedback information and the second feedback information on the at least one target resource.

5. The method according to claim 1, wherein the first device is a transmit side user equipment (UE), and the second device is a receive side UE; or
the first device is a control node, and the second device includes at least one of the transmit side UE or the receive side UE.

6. The method according to claim 5, wherein
the first device is the transmit side UE, and the second device is the receive side UE; and
determining, by the first device, the first resource comprises:
determining, by the first device, that a resource indicated by fifth indication information obtained from the control node is the first resource;
or
the first device is the transmit side UE, and the second device is the receive side UE; and
determining, by the first device, the first resource comprises:
determining, by the first device, the first resource from the candidate resource, wherein the candidate resource is a resource indicated by sixth indication information obtained by the first device from the receive side UE;
or
the first device is the control node, and the second device includes at least one of the transmit side UE or the receive side UE; and
after the first device sends the first indication information to the second device, the method further comprises:
receiving, by the first device on the first resource, the first feedback information sent by the receive side UE; and
sending, by the first device, the first feedback information to the transmit side UE.

7. A device, the device being a first device, the first device comprising: a processor, a memory, and a computer program that is stored in the memory and executable on the processor, wherein when the computer program is executed by the processor, in a sidelink transmission process, the first device performs:

determining a first resource, wherein the first resource is used for transmitting first feedback information; and
sending first indication information to a second device, wherein the first indication information is used to indicate the first resource; wherein
the first resource comprises at least one of: a target resource of a sidelink channel or a target resource of an uplink channel, and the target resource comprising at least one of a spatial domain resource or a code domain resource; wherein
when the computer program is executed by the processor, in a sidelink transmission process, the first device further performs:
receiving, by the first device, the first feedback information on the first resource, the first feedback information being carried in sidelink feedback control information (SFCI) in the sidelink channel; wherein:
when the computer program is executed by the processor, in a sidelink transmission process, the first device performs sending a first control channel to the second device, the first control channel comprising the first indication information, second indication information and a first identifier;
the second indication information is used to indicate a second resource, the second resource is used for transmitting at least one of first control information or first service data, and the second resource is different from the first resource; and
the first identifier is used to indicate an allocated identifier of data or data packet transmitted on the second resource, and the allocated identifier is used to indicate at least one of:
a serial number of the data or the data packet;
a number of the data or the data packet sent by the first device;
a total number of the data or the data packet sent by the first device; or
the data packet is an odd-numbered packet or an even-numbered packet sent by the first device.

8. The device according to claim 7, wherein the sidelink channel is a physical sidelink control channel, a physical sidelink shared channel, or a physical sidelink feedback channel, the uplink channel is a physical uplink control channel or a physical uplink shared channel, and the target resource further comprises at least one of a time domain resource, or a frequency domain resource.

9. The device according to claim 7, wherein
the first control channel comprises any one of: a physical sidelink control channel or a physical downlink control channel.

10. The device according to claim 7, wherein the first device is a transmit side user equipment (UE), and the second device is a receive side UE; or
the first device is a control node, and the second device includes at least one of the transmit side UE or the receive side UE.

11. A device, the device being a receive side user equipment (UE), the receive side UE comprising: a processor, a memory, and a computer program that is stored in the memory and executable on the processor, wherein when the computer program is executed by the processor, in a sidelink transmission process, the receive side UE performs:
receiving first indication information, wherein the first indication information is used to indicate a first resource, and the first resource is used to transmit first feedback information; and sending the first feedback information to a target device on the first resource, wherein the target device comprises at least one of a transmit side UE or a control node; wherein the first resource comprises at least one of: a target resource of a sidelink channel or a target resource of an uplink channel, and the target resource comprising at least one of a spatial domain resource or a code domain resource; and the first feedback information is carried in sidelink feedback control information (SFCI) in the sidelink channel;

the receive side UE further performs receiving a first control channel, the first control channel comprising the first indication information, second indication information and a first identifier;

the second indication information is used to indicate a second resource, the second resource is used for transmitting at least one of first control information or first service data, and the second resource is different from the first resource; and the first identifier is used to indicate an allocated identifier of data or data packet transmitted on the second resource, and the allocated identifier is used to indicate at least one of the following:
a serial number of the data or the data packet;
a number of the data or the data packet sent by the first device;
a total number of the data or the data packet sent by the first device; or
the data packet is an odd-numbered packet or an even-numbered packet sent by the first device.

12. The device according to claim 11, wherein the sidelink channel is a physical sidelink control channel, a physical sidelink shared channel, or a physical sidelink feedback channel, the uplink channel is a physical uplink control channel or a physical uplink shared channel, and the target resource further comprises at least one of a time domain resource, or a frequency domain resource.

13. The device according to claim 11, wherein the first control channel comprises any one of: a physical sidelink control channel or a physical downlink control channel.

14. The device according to claim 11, wherein the receive side UE further performs:
receiving third indication information and fourth indication information, wherein the third indication information is used to indicate the third resource, the fourth indication information is used to indicate the fourth resource, the third resource is used to transmit the second feedback information, and the fourth resource is used to transmit at least one of the second control information or second service data, the third resource is different from the fourth resource, and the third resource comprises at least one of: the target resource of the sidelink channel or the target resource of the uplink channel, and the third resource is the same as at least one target resource in the first resource; and
sending the first feedback information and the second feedback information to the target device on at least one target resource.

15. The device according to claim 14, wherein
the third indication information and the fourth indication information are carried in a second control channel, the second control channel further comprises a second identifier, and the second identifier is used to indicate an allocated identifier of data transmitted on the fourth resource.

16. The device according to claim 11, wherein before receiving the first indication information, the receive side UE further performs:
sending target indication information, wherein the target indication information is used to indicate a candidate resource, and the candidate resource is used to determine the first resource.

* * * * *